United States Patent
Smith

(10) Patent No.: US 7,477,734 B1
(45) Date of Patent: Jan. 13, 2009

(54) PACKET SWITCHING DIALING PLAN INTERFACE TO/FROM PSTN NETWORKS

(75) Inventor: Patrick Smith, Garland, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 992 days.

(21) Appl. No.: 10/701,716

(22) Filed: Nov. 4, 2003

(51) Int. Cl.
*H04M 7/00* (2006.01)

(52) U.S. Cl. .............................. 379/220.01; 379/221.01; 379/221.13; 379/219; 370/352; 370/353; 370/354

(58) Field of Classification Search ............ 379/220.01, 379/221.01, 221.13, 219; 370/352, 353, 370/354
See application file for complete search history.

(56) References Cited

U.S. PATENT DOCUMENTS

| | | | | |
|---|---|---|---|---|
| 5,475,749 A | * | 12/1995 | Akinpelu et al. | ....... 379/221.02 |
| 6,021,126 A | * | 2/2000 | White et al. | ................. 370/352 |
| 6,069,890 A | * | 5/2000 | White et al. | ................. 370/352 |
| 7,042,999 B2 | * | 5/2006 | Goldstein et al. | ...... 379/220.01 |
| 2005/0068942 A1 | * | 3/2005 | Chu et al. | .................... 370/352 |

OTHER PUBLICATIONS

"Midwest Region Primer for Local Number Portability", Issue 2, www.ported.com/midlnp.htm, pp. 1-34, 2002.
"Number Portability: Ensuring Convenience and Fostering Competition in Telecommunications", The International Engineering Consortium, www.iec.org, pp. 1-26, date unknown.
"Multimedia Residential Services, Multimedia arrives in the Home!", Service Brief, Nortel Networks, pp. 1-4, 2002.
"A New Era of Services, Nortel Networks new Interactive Multimedia Server enables the creation and delivery of dozens of new telephone, Internet, and video services", Product/Service Bulletin, Nortel Networks, pp. 1-2, 2002.
"Multimedia Communications Portfolio, Adding value to the carrier's services portfolio with the Multimedia Communication Server 5200", Portfolio Brief, Nortel Networks, pp. 1-4, 2003.

* cited by examiner

*Primary Examiner*—Quynh H Nguyen

(57) ABSTRACT

The present invention is directed to a method and apparatus for accessing a packet node or device through a circuit-switched network. Circuit-switched technology, such as local number portability techniques, and packet-switching technology, such as soft switches, are integrated in a network. As such, calls may originate from a circuit-switched network and terminate in a packet-switched network.

18 Claims, 3 Drawing Sheets

PACKET SWITCHING DIALING PLAN INTERFACE TO/FROM PSTN NETWORKS

BACKGROUND OF THE INVENTION

1. Field of the Invention

This invention relates to infrastructure. Specifically, the present invention relates to communication infrastructure.

2. Description of the Related Art

Modern communication networks include circuit-switched networks and packet-switched networks. In a circuit-switched network, a circuit (e.g., one path) is established between end users. The end users have exclusive use of the circuit until the connection is released. In a packet-switched network, communication is also established between end users. However, the communication paths are shared in a packet-switched network. Messages transmitted between the end users are segmented into packets. The packets may then take different paths across the network.

Conventional voice communication is typically implemented with circuit-switched technology. In a conventional telephony system, communication is established between an end user and switching hardware. The switching hardware is typically considered an "originating switch," such as a private branch exchange (PBX) or a central office. The PBX or the central office may be able to switch a call directly to a second end user if the second end user is connected to the PBX or central office. In the alternative, the call may be switched through a Public Switched Telephone Network (PSTN). Most conventional PSTN networks are implemented with circuit-switched technology.

In order to accurately locate and switch calls in the PSTN, a numbering plan known as the North American Numbering Plan (NANP) (e.g., XXX-XXXX) is implemented in North America. However, as the name implies, there are other numbering plans in other areas of the world. In the NANP, end users are given a specific number (i.e., predefined number) and the number is used to locate end users and switch calls in a network, such as a circuit-switched network.

As users move and change locations in conventional networks, a number of methods have developed which route and switch calls to end users. For example, routing methods, such as Local Number Portability (LNP), have been implemented. LNP is a circuit-switched network capability, which allows an end user to change a service provider and/or service type without changing their telephone number. Three categories of LNP are typically defined; (1) service provider portability, (2) location portability; and (3) service portability. Service provider portability allows an end user to change service providers while retaining his/her telephone number. Location portability allows an end user to change from one geographic area to another while retaining his/her telephone number. Service portability allows an end user to change service while retaining his/her telephone number with the same service provider. Service provider portability is implemented using a Location Routing Number.

A Location Routing Number (LRN) is used to implement LNP technology. LRN is a six-digit number used to access ported numbers (e.g., LNP numbers). As a result, the LRN serves as a network address. Carriers routing telephone calls to end users that have transferred their telephone numbers from one service provider to another obtain the LRN that corresponds to the dialed telephone number. The service provider then routes the call to the new service provider based on the LRN.

In addition to the foregoing circuit-switched technologies, conventional voice communications are continually advancing. For example, voice communications using packet-switched technology have been developed. Two approaches worthy of note include datagram communications and virtual circuit communications. In both forms of packet-switching, voice signals are first digitized and segmented into packets. In virtual circuit communications, the packets follow a path that is established between two end users. This may be considered a circuit-switched call that uses packets. In datagram technology, each packet is an individual unit and may follow its own path across the network from a sending end user to a receiving end user.

With the explosion of the Internet, voice-based communications are no longer just going over traditional voice communications networks, but are now going over the Internet. In the past, Internet networks were synonymous with data networks and the PSTN was considered a voice network. The lines between the Internet and traditional voice networks (e.g., PSTN) have blurred. As a result, technology has now been developed which enables the processing of voice calls across packet networks. One conventional type of technology for processing voice calls across packet networks is known as the softswitch.

A softswitch, as defined by the International Softswitch Consortium, as a software-based entity that provides call control functionality. A softswitch typically includes a call agent (e.g., media gateway controller, softswitch), media gateway, signaling gateway, feature server, application server, media server, management, provisioning and billing interfaces. A call agent provides the call logic or call control signaling for one or more media gateways. The media gateway transforms media from one transmission format to another. The signaling gateway encapsulates and transports PSTN signaling protocols over IP. The feature server provides enhanced call control services, such as network announcements, three-way calling, call waiting, etc. The application server provides the service logic and execution for one or more applications. The media server performs media processing on packet media streams. The management, provisioning, and billing interfaces provide management provisioning and billing functionality.

The components of a softswitch may be located in a single unit or may be distributed. While softswitch technology provides for more flexibility and speed in implementing communication networks, there is processing overhead required in updating the different components of a softswitch. For example, conventional methods of updating routing software in a softswitch is time consuming and arduous.

A number of different protocols are implemented on softswitches to operate the softswitch. Examples of softswitch protocols include the Session Initiation Protocol (SIP), H.323, H.248, etc. promulgated by the Softswitch Consortium. A conventional SIP implementation includes two standard components: (1) a SIP user agent, and (2) a SIP network server. The SIP user agent is the end user component of the SIP protocol. The SIP server is a network device that manages the signaling associated with multiple calls.

The SIP user agent includes a client component, known as the User Agent Client (UAC), and a server component, known as the User Agent Server (UAS). The client component initiates the calls and the server component answers the calls. As a result, peer-to-peer calls may be made using a client-server protocol.

SIP user agents may be implemented as lightweight clients suitable for embedding in end user devices, such as mobile handsets or Personal Data Assistants (PDAs). In the alternative, a SIP user agent may be implemented as a desktop application that binds with other software applications, such as contact managers, etc.

The SIP servers perform a number of functions, such as name resolution, user location, and message processing. For example, the SIP servers provide name resolution and user location of end users. In addition, since a calling party is unlikely to know the IP address or host name of the called party, the SIP server forwards messages to other servers using next hop routing protocols.

Conventional SIP servers operate in two different modes: state-oriented and stateless. A server operating in a state-oriented mode remembers the incoming requests it receives, along with the responses it sends back, and the outgoing requests it sends. A SIP server operating in stateless mode forgets all information once it has sent on a request. Stateless servers are typically implemented in the backbone of the SIP infrastructure while state-oriented mode servers are typically implemented in local devices close to the user agents and controlling domains of users.

As networks evolve, circuit-switched networks are integrating with the packet-switched networks. Therefore, a call initiating in a circuit-switched networks may ultimately terminate in a packet-switched network. The alternative is also true, a call initiating in a packet-switched network may terminate in a circuit-switched network.

Thus, there is a need for a method and apparatus that enables calls to transition seamlessly across various networks. There is a need for a method and apparatus for initiating, switching, and terminating calls across different networks.

SUMMARY OF THE INVENTION

A method and apparatus for routing calls through a PSTN network to a terminating packet device is presented. In one embodiment, a database is added to a circuit-switch. The circuit switch uses the database to perform an LRN translation. The LRN terminates at a softswitch, such as a SIP compliant softswitch. The softswitch routes the call across a packet-switched network. As such a call may be initiated from a circuit-switched network and terminate at a packet device in a packet-switched network.

In one embodiment, Local Number Portability (LNP) is used to route calls terminating at a packet telephone, packet telephony node, packet telephony proxy server, or PSTN switch with an interface to a packet network, through the public telephone network by assigning the packet telephone, the packet telephony node, the packet telephony proxy server, or the PSTN switch with an interface to a packet network with a Location Routing Number (LRN).

In one embodiment, the LRN enables a standard telephone call to a packet network interface where the LRN and a dialed number is used to identify a specific packet network and Internet Protocol (IP) address (i.e., packet address) associated with a packet-network node or device. As a result, the call initiated in a circuit-switched network may be terminated at the packet-node or device.

A method of routing comprises the steps of receiving call information associated with a ported number in a circuit switch device; performing a query in response to receiving the call information; receiving a routing number in response to performing the query; and switching a call to a packet gateway in response to receiving the routing number.

A method of operating a network comprises the steps of receiving call information representing a call, the call information originating from a circuit-switch, the call information comprising a dialed number and a location routing number; terminating the call in response to the location routing number; translating the call in response to terminating the call and in response to the dialed number; and switching the call to an address associated with the dialed number.

A method of operating a network comprises the steps of translating a dialed number associated with a call to a local routing number at a circuit-switch; switching the call at the circuit switch in response to translating the dialed number; terminating the call at a packet-switch device in response to switching the call and in response to the local routing number; and translating the dialed number to a network address in response to terminating the call at the packet-switch device.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
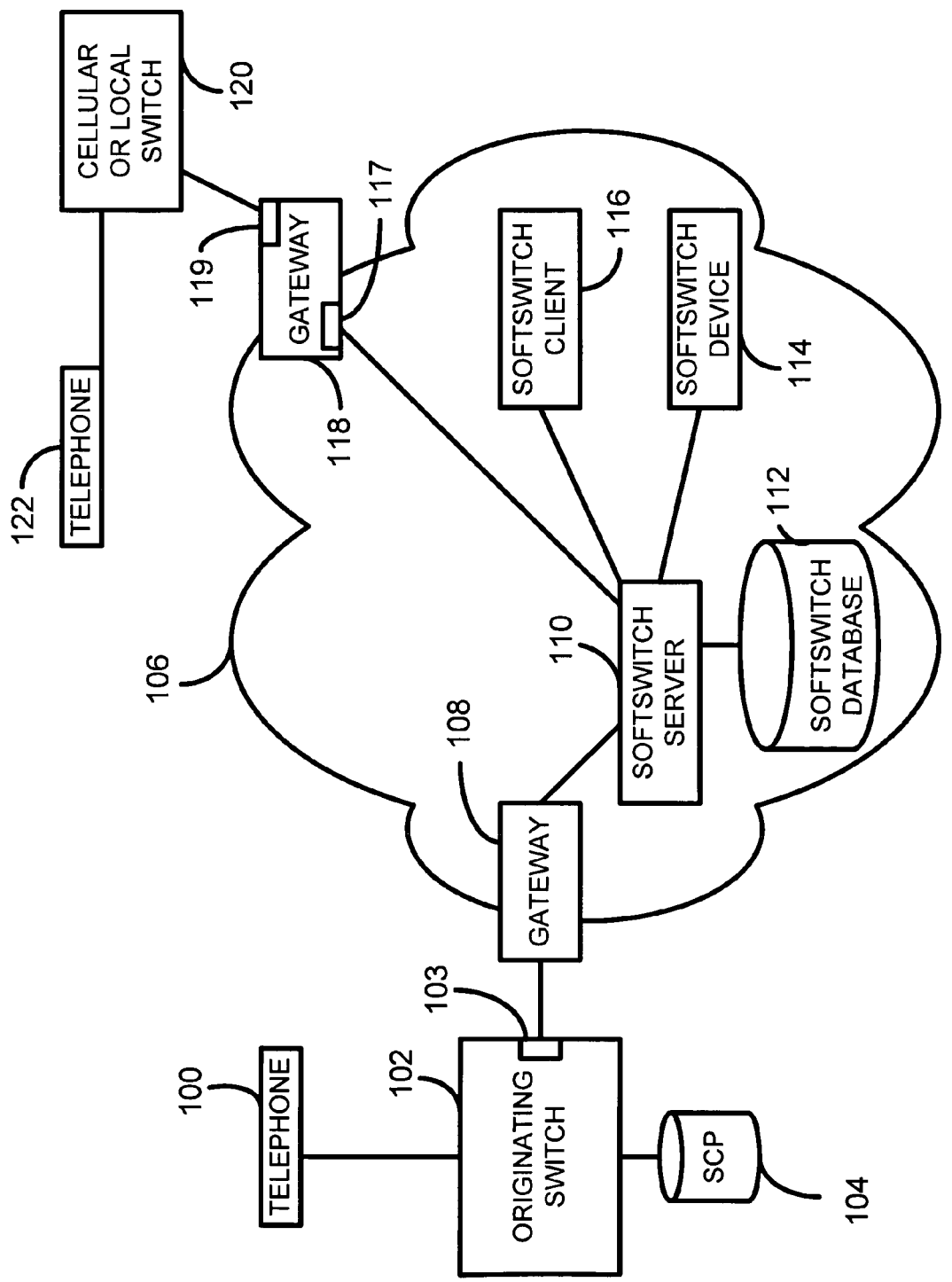
FIG. 1 displays one embodiment of a network architecture implementing the method of the present invention.

FIG. 1 displays a network architecture implementing the method of the present invention. A telephone is shown as 100. In one embodiment, the telephone 100 is a conventional telephone capable of use in a public service telephone network (PSTN), such as a circuit-switched network.

The telephone 100 is in communication with an originating switch 102. In one embodiment, the originating switch 102 is implemented as a circuit switch capable of switching a call to a public network. In a second embodiment, the originating switch 102 is a time-division multiplexed switch capable of switching a call to a public network. In yet another embodiment, the originating switch 102 is a circuit switch including a packet switch interface 103 for switching a call from the originating switch 102 to a packet-switched network.

A database 104 is in communication with the originating switch 102. The database 104 may be implemented as a relational database, a text file, etc. In one embodiment, the database 104 is implemented as a Service Control Point (SCP) compliant database. In another embodiment, the database 104 maps called numbers to routing numbers. However, it should be appreciated that the database 104 may implement a number of fields that translate from a called party identifier to a packet device identifier.

A network 106 is presented. In one embodiment, the network 106 is implemented as a packet-switched network. In another embodiment, the network 106 represents the Internet.

A gateway 108 provides an interface between the originating switch 102 and the network 106. Specifically, in one embodiment, the gateway 108 may communicate with a packet interface 103 on the originating switch 102. In another embodiment, the gateway 108 may serve as a packet interface 103 for the originating switch 102. In yet another embodiment, the gateway 108 is a SIP/H.323/H.248/MEGACO compliant gateway. Therefore, the gateway 108 performs signaling consistent with these standards.

A softswitch server 110 is shown. The softswitch server 110 may include any server compliant with packet routing protocols, such as SIP, H.323, H.248, MEGACO, etc. In one embodiment, the gateway 108 operates under control of the softswitch server 110 that implements various packet routing protocols. In another embodiment, the softswitch server 110 is implemented as an application server. A variety of applications may be implemented using the softswitch server, for example, call forwarding, conference call, follow-me applications, etc may be implemented.

A softswitch database 112 is in communication with the softswitch server 110. In one embodiment, the softswitch database 112 may be implemented as a relational database. In another embodiment, the softswitch database 110 maps a routing number, such as an LRN to various packet nodes/devices within a packet network. In another embodiment, the softswitch database 110 may map a dialed number to various packet nodes/devices within a packet network.

The softswitch server 110 may communicate with a variety of nodes or devices within a packet switching network. For example, the softswitch server 110 may communicate with a softswitch device 114, such as a SIP device. In the alternative, the softswitch server 110 may communicate with a softswitch device 114, such as a packet telephone that is SIP compliant. Lastly, the softswitch server 110 may communicate with a softswitch client 116, such as a SIP client. It should be appreciated that the softswitch server 110 may communicate with any device directly connected to a packet network, such as network 106 or the softswitch server 110 may communicate with other gateways that terminate non-packet switching devices. In one embodiment, the softswitch server 110, the softswitch device 114, the softswitch client 116 reside in or communicate with a packet-switch network and are therefore each considered a packet-switch device. In another embodiment is should be appreciated that any communication devices that resides in or communicates with a packet-switch network using data packets is considered a packet switch device.

A gateway 118 is a second gateway that is communication with the softswitch server 110. The gateway 118 includes a packet switching interface 117, which enables communication with the softswitch server 110 and a non-packet switching interface 119 for communication with other communication technologies. For example, gateway 118, may communicate with cellular or local switch 120. Cellular or local switch 120 may then communicate with telephone 122 which may be implemented as a cellular telephone or a plain old telephone (POT) compliant telephone.

Figure 2:
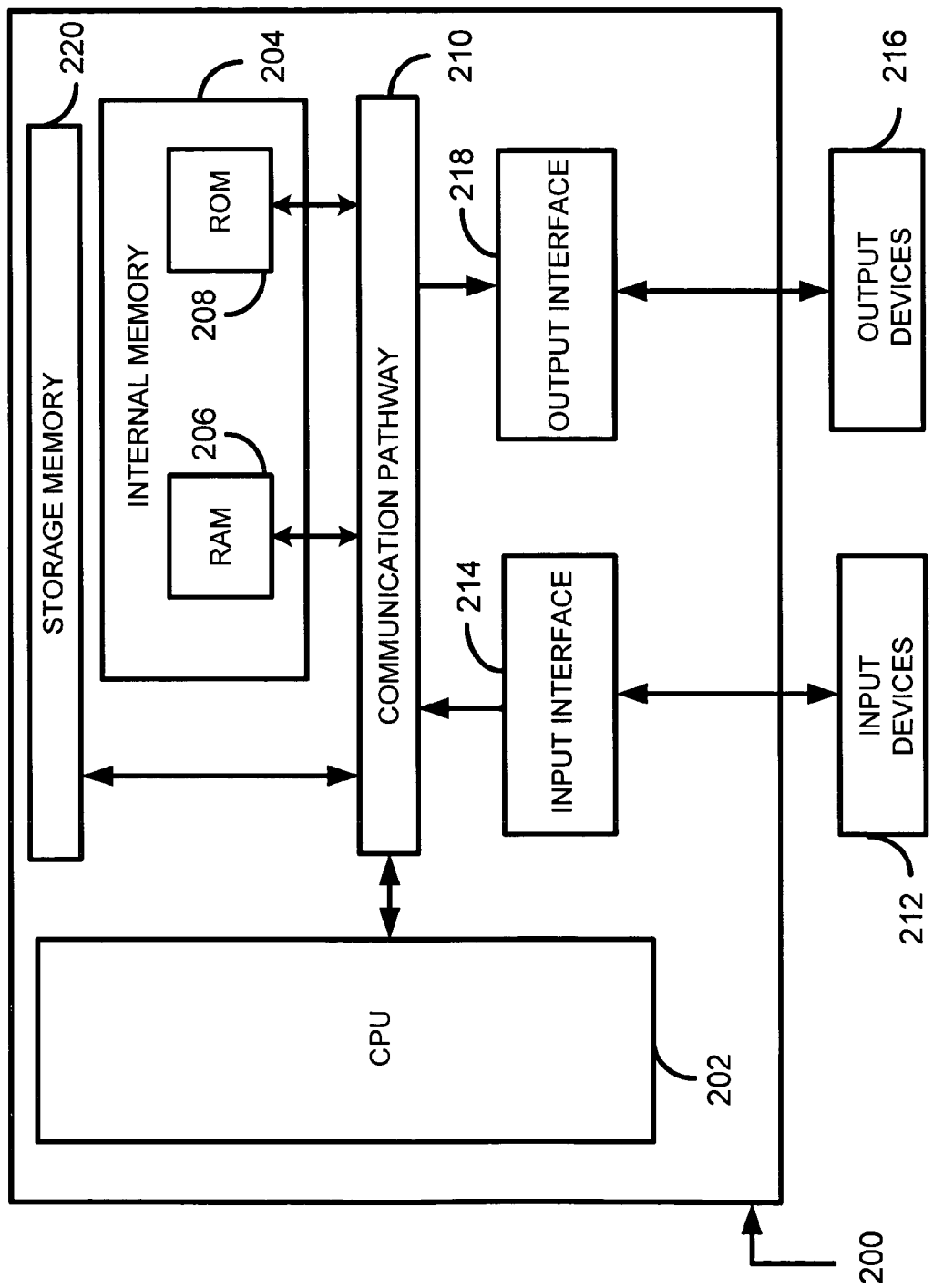
FIG. 2 displays one embodiment of a computer architecture implementing the method of the present invention.

In FIG. 2, a block diagram of a computer architecture implemented in accordance with the teachings of the present invention is shown. Telephone 100, originating switch 102, database 104, gateway 108, softswitch server 110, softswitch database 112, softswitch device 114, softswitch client 116, gateway 118, cellular or local switch 120, and telephone 122 of FIG. 1 may be implemented with the computer architecture 200 shown in FIG. 2. A central processing unit (CPU) 202 functions as the brain of the computer architecture 200. Internal memory 204 is shown. The internal memory 204 includes short-term memory 206 and long-term memory 208. The short-term memory 206 may be a Random Access Memory (RAM) or a memory cache used for staging information. The long-term memory 208 may be a Read Only Memory (ROM) or an alternative form of memory used for storing information. Storage memory 220 may be any memory residing within the computer 200 other than internal memory 204. In one embodiment of the present invention, storage memory 220 is implemented with a hard drive. A communication pathway 210 is used to communicate information within computer architecture 200. In addition, the communication pathway 210 may be connected to interfaces, which communicate information out of the computer architecture 200 or receive information into the computer architecture 200.

Input devices, such as tactile input device, joystick, keyboards, microphone, communications connections, or a mouse, are shown as 212. The input devices 212 interface with the system through an input interface 214. Output devices, such as a monitor, speakers, communications connections, etc., are shown as 216. The output devices 216 communicate with computer architecture 200 through an output interface 218.

Figure 3:
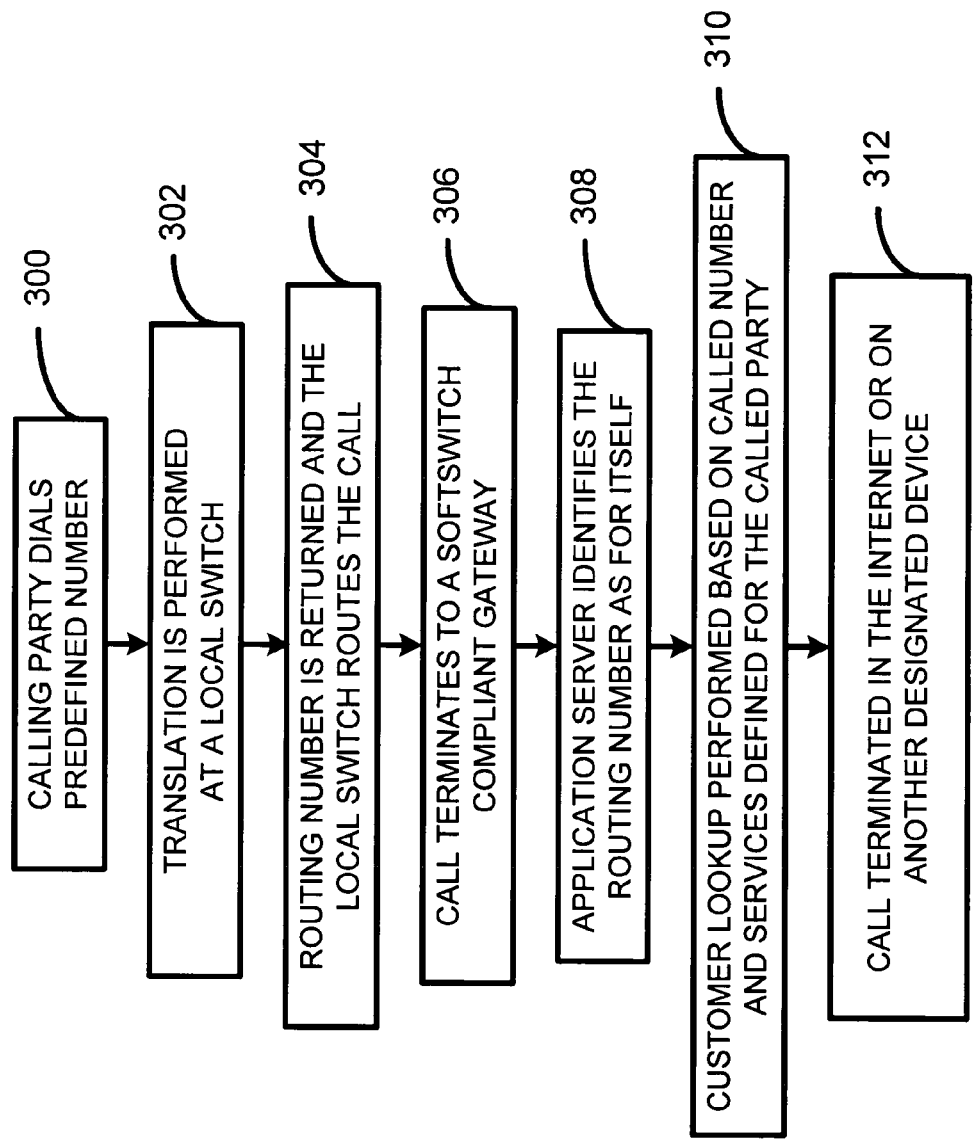
FIG. 3 displays a flow diagram implementing one embodiment of the method of the present invention.

FIG. 3 displays a flow diagram depicting a method of the present invention. FIG. 3 will be discussed in conjunction with FIG. 1. At 300, a calling party dials a predefined number (i.e., xxx-xxx-xxxx). For example, a calling party may use telephone 100 to dial a predefined number. In one embodiment, the predefined number may represent a number associated with a packet device communicating with a packet switching network.

At 302, a translation is performed at the local switch. For example, originating switch 102 communicates with database 104 to perform a translation of the called number. In one embodiment, where the called number is a ported number, the originating switch 102 will search the database 104 with the called number serving as a key for the search. The database 104 will map the called number to a local routing number (LRN) and an LRN is returned to the originating switch 102.

At 304, a routing number, such as an LRN, is returned to the originating switch 102 and the originating switch 102 forwards or switches the call based on the LRN. In one embodiment, the originating switch 102 is a circuit switch; therefore, the originating switch 102 performs a circuit-switch connection to a gateway 108.

At 306, the call terminates at a softswitch compliant gateway. For example, in one embodiment, the originating switch 102 performs a circuit switch to a softswitch-compliant gateway 108. The softswitch-compliant gateway 108 may represent any gateway that is under the control of softswitch protocols, such as SIP, H323, H248, Megaco, etc. The gateway 108 then forwards the call to a softswitch server 110.

At 308, a softswitch server 110, such as an application server, identifies the LRN as being the LRN of the softswitch server 110. At 310, a customer lookup is performed based on the called number and the services defined for the called party. For example, the softswitch server 110 may perform a customer lookup in softswitch database 112. In one embodiment, the dialed number may be mapped to various application services running on various packet network devices or nodes. In addition, the dialed number may be mapped to a packet or Internet address associated with the dialed number.

At 312, the call may be terminated in the Internet or on another designated device. In one embodiment, the softswitch server 110 may perform a database query of softswitch database 112 and determine the services, and/or Internet protocol compliant address (i.e., network address) associated with the dialed number. The softswitch server 110 may then receive a network address for the called party. For example, "xxx-xxx-xxxx@domainname.com" may represent a dialed party terminating network address. As such, the call may be forwarded from softswitch server 110 to softswitch device 114, softswitch client 116, or gateway 118. In the case where the network 106 is used as a pass through network, the call may be forwarded from softswitch server 110 to gateway 118, which then forwards the call to telephone 122 via cellular or local switch 120.

Thus, the present invention has been described herein with reference to a particular embodiment for a particular application. Those having ordinary skill in the art and access to the present teachings will recognize additional modifications, applications and embodiments within the scope thereof.

It is, therefore, intended by the appended claims to cover any and all such applications, modifications, and embodiments within the scope of the present invention.

What is claimed is:

1. A method of routing comprising the steps of:
   receiving call information for a call associated with a ported number in a circuit-switch device, the call information representing a dialed number;
   performing a query in response to receiving the call information;
   receiving a routing number in response to performing the query;
   terminating the call at a softswitch-compliant gateway;
   forwarding the call to a softswitch;
   receiving the call and querying a database using the dialed number to determine a network address associated with a packet-switch device; and
   forwarding the call from the softswitch server to the packet-switch device using the determined network address.

2. A method of routing as set forth in claim 1, wherein the query is performed on a Service Control Point (SCP) database.

3. A method of routing as set forth in claim 1, wherein the routing number is a location routing number.

4. A method of routing as set forth in claim 1, wherein the packet-switch device is Session Initiation Protocol compliant.

5. A method of routing as set forth in claim 1, wherein the packet-switch device is H.323 compliant.

6. A method of routing as set forth in claim 1, wherein the packet-switch device is a packet gateway.

7. A method of routing as set forth in claim 1, wherein the packet-switch device is a packet telephone.

8. A method of routing as set forth in claim 1, wherein the packet-switch device is a PSTN switch with an interface to a packet network.

9. A method of operating a network comprising the steps of:
   receiving call information representing a call, the call information originating from a circuit-switch, the call information comprising a dialed number and a location routing number;
   terminating the call at a softswitch-compliant gateway in response to the location routing number;
   forwarding the call to a softswitch;
   translating the call in the softswitch in response to forwarding the call and in response to the dialed number; and
   switching the call to a network address associated with the dialed number, the network address associated with a packet-switch device.

10. A method of operating a network as set forth in claim 9, wherein the network address is associated with a Session Initiation Protocol compliant device.

11. A method of operating a network as set forth in claim 9, wherein the network address is associated with an H.248 compliant device.

12. A method of operating a network as set forth in claim 9, wherein the network address is associated with an H.323 compliant device.

13. A method of operating a network comprising the steps of:
   translating a dialed number associated with a call to a local routing number at a circuit-switch;
   switching the call at the circuit-switch in response to translating the dialed number;
   terminating the call at a softswitch-compliant gateway in response to switching the call and in response to the local routing number;
   forwarding the call to a softswitch; and
   translating the dialed number to a network address in the softswitch in response to forwarding the call to the softswitch, the network address identifying a packet-switch device.

14. A method of operating a network as set forth in claim 13, wherein the packet-switch device is a Session Initiation Protocol compliant packet switch device.

15. A method of operating a network as set forth in claim 13, wherein the network address is an Internet protocol compliant address.

16. A system comprising:
   means for receiving call information for a call associated with a ported number in a circuit-switch device, the call information representing a dialed number;
   means for performing a query in response to receiving the call information;
   means for receiving a routing number in response to performing the query;
   means for terminating the call at a softswitch-compliant gateway;
   means for forwarding the call to a softswitch;
   means for receiving the call and querying a database using the dialed number to determine a network address associated with a packet-switch device; and
   means for forwarding the call from the softswitch server to the packet-switch device using the determined network address.

17. A system comprising:
   means for receiving call information representing a call, the call information originating from a circuit-switch, the call information comprising a dialed number and a location routing number;
   means for terminating the call at a softswitch-compliant gateway in response to the location routing number;
   means for forwarding the call to a softswitch;
   means for translating the call in the softswitch in response to forwarding the call and in response to the dialed number; and
   means for switching the call to a network address associated with the dialed number, the network address associated with a packet-switch device.

18. A system comprising:
   means for translating a dialed number associated with a call to a local routing number at a circuit-switch;
   means for switching the call at the circuit-switch in response to translating the dialed number;
   means for terminating the call at a softswitch-compliant gateway in response to switching the call and in response to the local routing number;
   means for forwarding the call to a softswitch; and
   means for translating the dialed number to a network address in the softswitch in response to forwarding the call to the softswitch, the network address identifying a packet-switch device.

* * * * *